US012044372B1

(12) United States Patent
Xie

(10) Patent No.: US 12,044,372 B1
(45) Date of Patent: Jul. 23, 2024

(54) FLEXIBLE WALL WASHER AND A MANUFACTURING PROCESS THEREOF

(71) Applicant: General Lighting Electronic Co., Ltd., Zhongshan (CN)

(72) Inventor: Jiuhuai Xie, Loudi (CN)

(73) Assignee: General Lighting Electronic Co., Ltd., Zhongshan (CN)

( * ) Notice: Subject to any disclaimer, the term of this patent is extended or adjusted under 35 U.S.C. 154(b) by 0 days.

(21) Appl. No.: 18/454,512

(22) Filed: Aug. 23, 2023

(30) Foreign Application Priority Data

Aug. 8, 2023 (CN) ........................ 202310995263.X

(51) Int. Cl.

| | |
|---|---|
| ***F21S 4/22*** | (2016.01) |
| ***F21K 9/90*** | (2016.01) |
| ***F21V 5/04*** | (2006.01) |
| ***F21V 17/16*** | (2006.01) |
| ***F21V 23/06*** | (2006.01) |
| *F21Y 115/10* | (2016.01) |

(52) U.S. Cl.
CPC .................................... *F21S 4/22* (2016.01); *F21K 9/90* (2013.01); *F21V 5/04* (2013.01); *F21V 17/164* (2013.01); *F21V 23/06* (2013.01); *F21Y 2115/10* (2016.08)

(58) Field of Classification Search
CPC ........ F21S 4/20; F21S 4/22; F21S 4/24; F21S 4/26; F21S 4/28; F21S 2115/10
See application file for complete search history.

(56) References Cited

U.S. PATENT DOCUMENTS 10,989,372 B2 * 4/2021 Meir ........................ F21V 21/02
2012/0162974 A1 * 6/2012 Yu ............................ F21S 4/28 362/218
2019/0011091 A1 * 1/2019 Meir ...................... H05K 3/361
2019/0049077 A1 * 2/2019 Corvese .................... F21S 4/24

* cited by examiner

*Primary Examiner* — Robert J May
(74) *Attorney, Agent, or Firm* — Birchwood IP

(57) ABSTRACT

The present invention discloses a flexible wall washer and a manufacturing process thereof, comprising a strip-shaped PCB, a plurality of LED chips, a plurality of flexible holders, and a plurality of lenses, wherein the PCB is provided with a plurality of pleated portions, the plurality of LED chips are uniformly distributed on the PCB between the two adjacent pleated portions, the plurality of flexible holders are hinged together at the front and the rear in sequence to form a chain holder, the rear side of each of the flexible holders is provided with a mounting cavity and the lens is installed in it. The PCB is provided on the rear side of the chain holder, the plurality of the lenses cover on the LED chips in one-to-one correspondence, and the pleated portion protrudes in the direction of the flexible holder.

10 Claims, 4 Drawing Sheets

FLEXIBLE WALL WASHER AND A MANUFACTURING PROCESS THEREOF

FIELD OF INVENTION

The present invention relates to the field of lighting technology, in particular to a flexible wall washer and a manufacturing process thereof.

BACKGROUND OF THE INVENTION

The conventional wall washer is made of aluminum structure which cannot be bent for application, and the profile cannot be used in extra-long applications due to transportation or installation constraints, especially in an arc-shaped construction or a corner multi-sided application, the profiled wall washer cannot be effectively bent for use. In this regard, the current flexible wall washer uses a bendable PCB with LED chips and a bendable holder that can fix the PCB to make it flexible and bendable. However, the current bendable PCB is generally provided by setting a notch on the PCB to achieve the bending, and the PCB is easily damaged with this notch; besides, the bendable holder is generally hinged by a plurality of small holders, each of which is provided with a deformation portion at both ends to make the holder capable of multi-directional bending, but the middle part of the small holder is a non-deformable material, which makes the overall deformation effect of the holder is undesirable, and it is difficult to bend arbitrarily with the PCB; and the middle of the small holder is provided with a mounting portion for mounting the lens protruding from the surface of the holder, the lens protrudes from the plane of the holder, making the surface of the holder is uneven, easy to affect the emission of light and take up more space. In addition, the current wall washers used in the outdoor applications need to be potted for waterproofing, the process is complex and difficult to effectively control the process of waterproofing.

SUMMARY OF THE INVENTION

The purpose of the present invention is to solve at least one of the technical problems existing in the prior art, to provide a flexible wall washer and a manufacturing process thereof which is not easily damaged, has a favorable light emission effect with a flat surface, saves space, and has a simple waterproofing process.

A flexible wall washer according to an embodiment of the first aspect of the present invention, comprising: a strip-shaped PCB, a plurality of LED chips, a plurality of flexible holders, and a plurality of lenses, the PCB being provided with a plurality of pleated portions, the plurality of the LED chips being uniformly distributed between the two pleated portions adjacent to each other on the PCB, the plurality of flexible holders are sequentially hinged at the front and the rear to form a chain holder, each of the flexible holders is provided with a mounting cavity on the rear side, and the top and bottom of the mounting cavity are respectively open, the flexible holder is provided with a mounting hole connected to the top opening of the mounting cavity, and the lens is installed in the mounting cavity through the mounting hole and the surface of the lens is flush with the surface of the flexible holder. The PCB is disposed on the rear side of the chain holder, the plurality of the lenses cover on the LED chips through the bottom opening of the mounting cavity in one-to-one correspondence, and the pleated portion protrudes in the direction of the flexible holder.

According to some embodiments of the present invention, a notch is provided in the middle of the pleated portion.

According to some embodiments of the present invention, a first stage is provided on the front side of the front end of the flexible holder, the first stage being provided with a first perforation; a second stage is provided on the back side of the rear end of the flexible holder, the thickness of the first stage and the thickness of the second stage being equal to the thickness of the flexible holder, and the second stage being provided with a first snap portion extending downwardly, the first snap portion being capable of rotationally snapping into the first perforation of the adjacent flexible holder.

According to some embodiments of the present invention, the first stage is provided with a second perforation and the second stage is correspondingly provided with a second snap portion capable of rotationally snapping into the second perforation.

According to some embodiments of the present invention, the outer edge of the rear side of the first stage is provided with a curved projection extending downwardly, and the inner edge of the second stage is provided with a curved bent portion capable of rotationally snap-fitting with the adjacent curved projection of the flexible holder.

According to some embodiments of the present invention, the curved projection, the first perforation, and the second perforation are arranged in sequence along the same horizontal line, and the pleated portion is located directly below the first perforation.

According to some embodiments of the present invention, further comprising a plurality of positioning plates corresponding one-to-one with the flexible holders, and a snap-in structure provided on the rear side of the flexible holder, the positioning plate being able to snap with the snap-in structure to fix the PCB between the positioning plate and the flexible holder.

According to some embodiments of the present invention, a positioning post is provided at the bottom of the mounting cavity, and a corresponding positioning hole is provided on the PCB and the connection plate, respectively, and the positioning post is sequentially snapped into the corresponding positioning hole.

According to some embodiments of the present invention, comprising a flexible lamp housing, wherein the flexible lamp housing is sleeved to the PCB and the chain holder.

A manufacturing process of the flexible wall washer according to an embodiment of the second aspect of the present invention applied to the above flexible wall washer, comprising: Step 1, mounting the LED chips and electronic components on the PCB; Step 2, forming a pleated portion on the PCB; Step 3, mounting the lenses on the flexible holder and connecting the plurality of flexible holders sequentially head to tail to form a chain holder; Step 4, fixing the PCB to the chain holder through the positioning plate; Step 5, forming a light strip by wrapping the PCB and the chain holder into a molded flexible lamp housing through one-piece extrusion; and Step 6, cutting the light strip into corresponding lengths according to the demand, and then waterproofing and plugging the front and rear of the light strip.

The flexible wall washer and the manufacturing process according to the embodiment of the present invention have at least the following beneficial effects: due to the PCB is provided with a pleated portion, when the PCB is bent or twisted, the pleated portion undergoes deformation, and due to the deformation space of the pleated portion is larger, it acts as a buffer so that the PCB can be arbitrarily bent in multiple directions and is not easily damaged; besides, due to the flexible holder itself is flexible, can be deformed in multiple directions, when the plurality of flexible holders are hinged to form a chain holder, the chain holder as a whole can follow the PCB to bend arbitrarily in multiple directions with a favorable bending effect, and due to the mounting cavity for installing the lens is set on the rear side of the chain holder, so the surface of the chain holder is flat, and it will not affect the emission of light from the lens; and because the pleated portion is protruded in the direction of the flexible holder, it further saves space; in addition, by using the one-piece extrusion process, it also provides a favorable waterproofing effect and is easy to process.

Additional aspects and advantages of the present invention will be given, in part, as will become apparent from the following description, or as will be learned through the practice of the present invention.

BRIEF DESCRIPTION OF THE DRAWINGS

Specific embodiments of the present invention will be further described below in connection with the accompanying drawings.

DETAILED DESCRIPTION OF THE PREFERRED EMBODIMENTS

Figure 1:
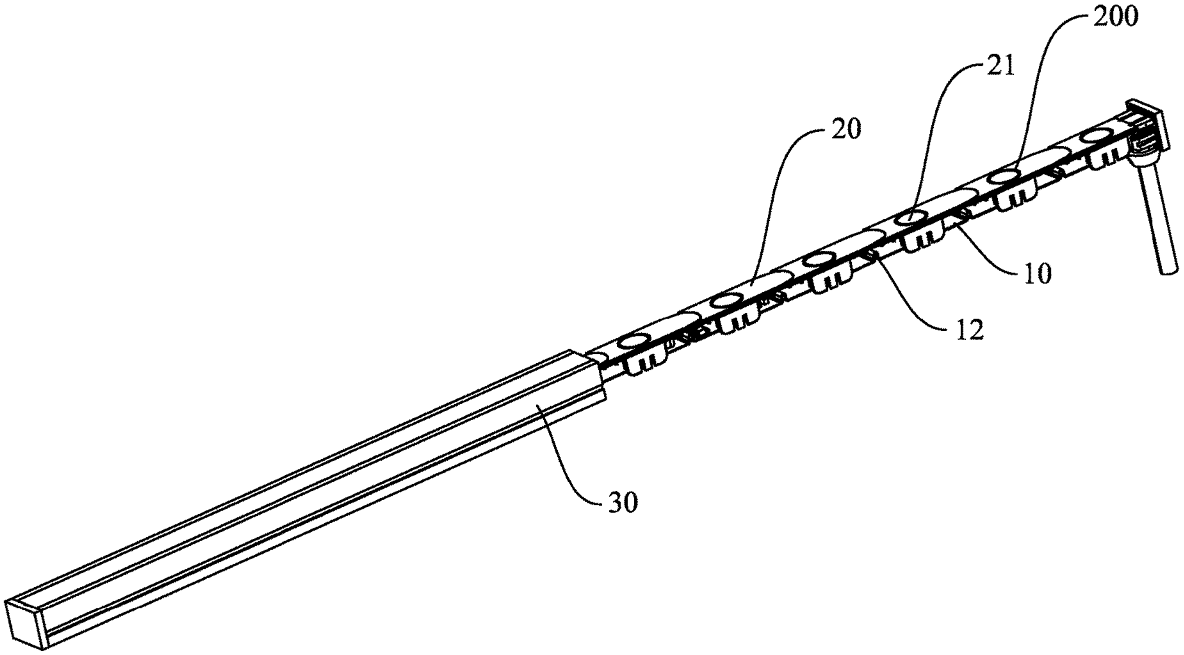
FIG. 1 is a structural diagram of a flexible wall washer.

This section will describe in detail the specific embodiments of the present invention, the preferred embodiments of the present invention are shown in the accompanying drawings, the role of the accompanying drawings is to supplement the description of the specification so that people can intuitively and graphically understand each technical feature of the present invention and the overall technical solutions, but it cannot be construed as limiting the scope of protection of the present invention.

In the description of the present invention, it should be understood that orientation descriptions such as up, down, front, rear, left, right and the like, which refer to orientation or positional relationships indicated as being based on those shown in the accompanying drawings, are intended only to facilitate the description of the present invention and to simplify the description, and do not indicate or suggest that the device or element referred to must have a particular orientation, be constructed and operated with a particular orientation, and therefore should not be construed as a limitation of the present invention.

In the description of the present invention, the meaning of a number is one or more, the meaning of a plurality is more than two, greater than, less than, more than, etc. is understood to exclude the present number, and above, below, within, etc. is understood to include the present number. If there is a description to the first, the second is used only for the purpose of distinguishing technical features and is not to be understood as indicating or implying relative importance or implicitly specifying the number of technical features indicated or implicitly specifying the sequential relationship of the technical features indicated.

Referring to FIGS. 1 to 4, the flexible wall washer of an embodiment of the present invention comprises a strip-shaped PCB 10, a plurality of LED chips 11, a plurality of flexible holders 20, a plurality of lenses 21, and a flexible lamp housing 30 which is sleeved on the PCB 10 and the flexible holders 20, is made of silicone, and is provided with a light-transmitting portion 31 with the LED chips 11 and the lens 21 facing towards it, respectively. The flexible holder 20 may be made of plastic, and the lens 21 is shaped as a cone with a wider top and a narrower bottom for reflecting the light; the PCB 10 is provided with a plurality of pleated portions 12; the plurality of LED chips 11 are uniformly distributed between two adjacent pleated portions 12 on the PCB 10; the plurality of flexible holders 20 are sequentially hinged at the front and the rear to form a chain holder, and a mounting cavity 22 is provided on the rear side of each of the flexible holders 20, and the mounting cavity 22 is open at the top and at the bottom, respectively; the flexible holder 20 is provided with a mounting hole 200 that is connected to the top opening of the mounting cavity 22, the lens 21 is installed in the mounting cavity 22 through the mounting hole 200, and the surface of the lens 21 is flush with a surface of the flexible holder 20; the PCB 10 is disposed on the rear side of the chain holder, the plurality of lenses 21 cover on the LED chips 11 in one-to-one correspondence through the bottom opening of the mounting cavity 22, and the pleated portion 12 protrudes in the direction of the flexible holder 20; due to the PCB 10 is provided with a pleated portion 12, the pleated portion 12 is deformed when the PCB 10 is bent or twisted, and due to the larger deformation space of the pleated portion 12, it acts as a buffer so that the PCB 10 can be bent in multiple directions in an arbitrary manner and not easily damaged; and due to the flexible holder 20 itself is flexible and capable of multidirectional deformation, when the plurality of flexible holders 20 are hinged at the front and the rear to form a chain holder, the chain holder as a whole is capable of arbitrary multidirectional bending following the PCB 10 with a favorable bending effect, and due to the mounting cavity 22 for mounting the lens 21 is provided on the rear side of the chain holder, the surface of the chain holder is flat and does not affect the light emission from the lens 21; and due to the pleated portion 12 protrudes toward the flexible holder 20, it further saves space.

Figure 2:
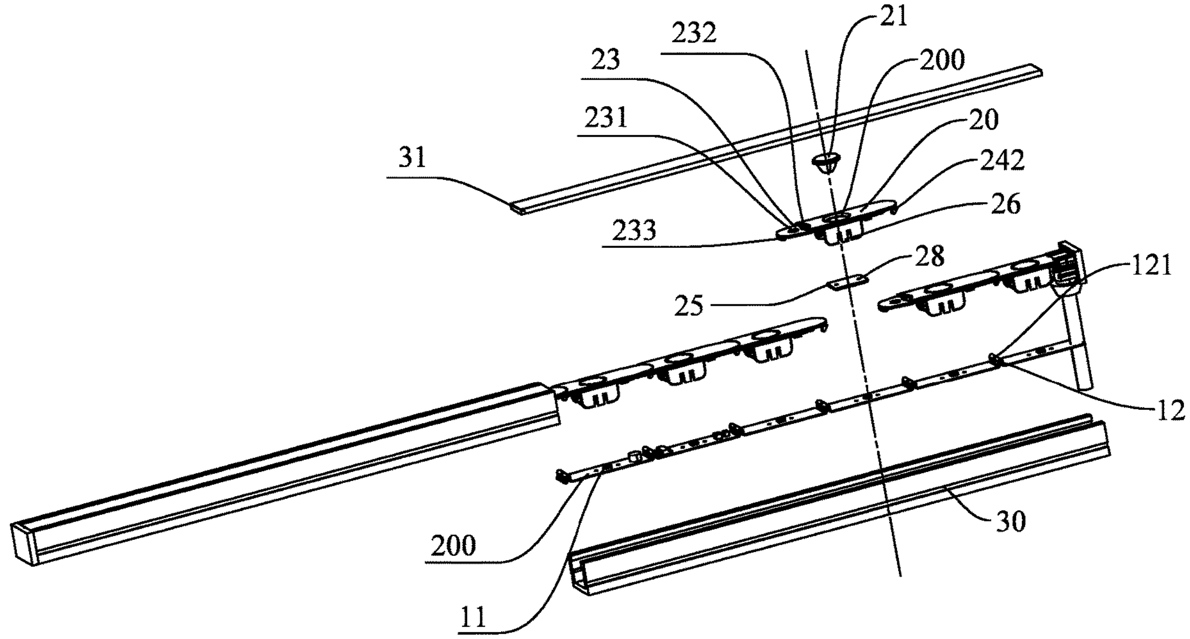
FIG. 2 is an exploded structural diagram of the flexible wall washer.

As shown in FIG. 2, in some embodiments, a notch 121 is provided in the middle of the pleated portion 12 to further increase the deformation space of the pleated portion 12.

In some embodiments, a flexible reinforcing rib, which may be a steel wire rope, is also included, which passes sequentially through the notches 121 of the plurality of pleated portions 12 and is fixedly connected to the ends of the PCB 10 to enhance the bending performance of the PCB 10 and to strengthen the PCB's resistance to tensile force.

Figure 3:
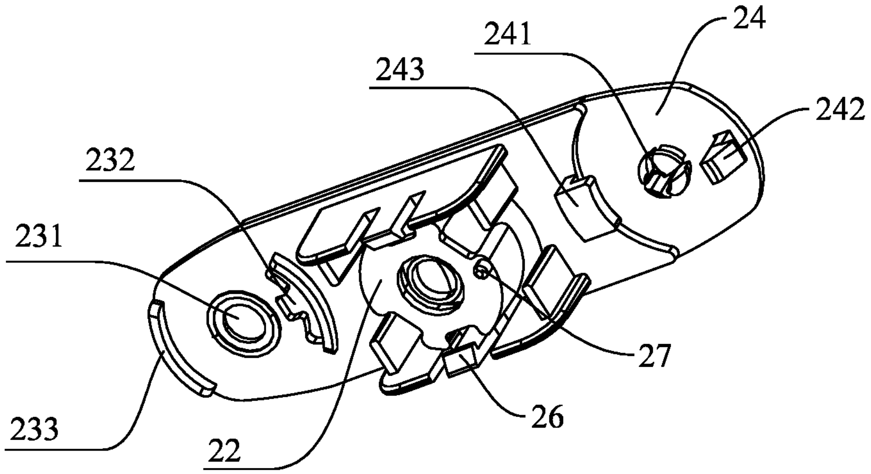
FIG. 3 is a structural diagram of a flexible holder.

As shown in FIGS. 2 and 3, a first stage 23 is provided on the front side of the front end of the flexible holder 20, a first perforation 231 being provided in the first stage 23; a second stage 24 is provided on the back side of the rear end of the flexible holder 20, with the thickness of the first stage 23 and the thickness of the second stage 24 being equal to the thickness of the flexible holder 20 so that when adjacent flexible holders 20 are connected at the front and rear ends, the adjacent first stage and second stage cooperate to snap together to make the connection of the adjacent two flexible holders smooth and aesthetic; the thickness of the flexible holder 20 referred to herein refers to the thickness of the front and rear ends of the flexible holder 20 without the first stage and second stage;

The second stage 24 is provided with a downwardly extending first snap portion 241 having four annularly spaced resilient snapping posts, the first snap portion 241 being able to rotatably snap into the first perforation 231 of the adjacent flexible holder 20 so that the four resilient snapping posts are tightly abutted against the first perforation 231 by extruding through the first perforation 231, thereby allowing the two adjacent flexible holders 20 to rotate with each other, and since the thickness of the first stage 23 and the thickness of the second stage 24 are equal to the thickness of the flexible holder 20, it makes the connection between the front and the rear smooth and aesthetic and does not affect the emission of light.

In addition, the first stage 23 is provided with a second perforation 232, and the second stage 24 is correspondingly provided with a second snap portion 242 that can rotatably snap into the second perforation 232, and the width of the second snap portion 242 is smaller than the length of the second perforation 232, thereby allowing the two adjacent flexible holders 20 to be rotated relative to each other and more securely connected.

Figure 4:
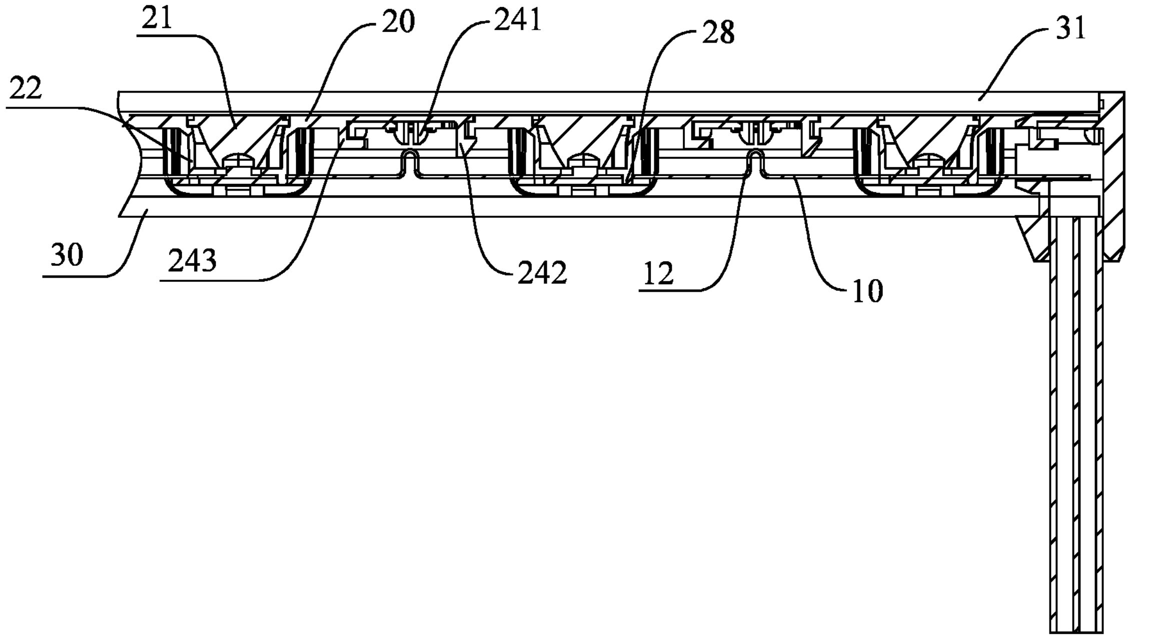
FIG. 4 is a cross-sectional view of the flexible wall washer.

As shown in FIGS. 3 and 4, the outer edge of the first stage is provided with a curved projection 233 extending downwardly on the rear side thereof, and the inner edge of the second stage 24 is provided with a curved bent portion 243 capable of rotationally snap-fitting with the curved projection 233 of the adjacent flexible holder 20, thereby making the connection of the adjacent flexible holder 20 more secure; the projection, the first perforation 231, and the second perforation 232 are arranged in sequence from left to right along the same horizontal line, and the pleated portion 12 is located directly below the first perforation 231, which has a well-arranged structure and saves space.

As shown in FIGS. 2 and 4, there are also comprised a plurality of positioning plates 25 corresponding one-to-one with the flexible holders 20, the rear side of the flexible holder 20 is provided with a snap-in structure 26 consisting of a pair of snapping buckles distributed respectively on the front and rear sides between the flexible holders, and the positioning plate 25 is capable of being snapped together with the snapping buckles to fix the PCB 10 between the positioning plate 25 and the flexible holder 20. Moreover, the bottom of the mounting cavity 22 is provided with a positioning post 27, and the PCB 10 and the connection plate are respectively provided with corresponding positioning holes 28, and the positioning post 27 is sequentially snapped into the corresponding the positioning holes 28, thereby facilitating the positioning connection of the PCB 10 and the positioning plate 25 with the flexible holder 20.

The manufacturing process of the flexible wall washer of the present embodiment comprises: Step 1, mounting the LED chips 11 and electronic components on the PCB 10; Step 2, forming a pleated portion 12 on the PCB 10; Step 3, mounting the lenses 21 on the flexible holder 20 and connecting the plurality of flexible holders 20 sequentially head to tail to form a chain holder; Step 4, fixing the PCB 10 to the chain holder through the positioning plate 25; Step 5, forming a light strip by wrapping the PCB 10 and the chain holder into a molded flexible lamp housing 30 through one-piece extrusion; and Step 6, cutting the light strip into corresponding lengths according to the demand, and then waterproofing and plugging the front and rear of the light strip; by using the one-piece extrusion process, it provides a favorable waterproofing effect and is easy to process.

It will readily be appreciated by those skilled in the art that the above preferred methods can be freely combined and superimposed without conflict.

The foregoing is only a preferred embodiment of the present invention and is not intended to limit the scope of the present invention, and all equivalent structural transformations made by utilizing the contents of the specification of the present invention and the accompanying drawings under the inventive concept of the present invention, or utilized directly or indirectly in other related fields of technology, are all included within the scope of the patent protection of the present invention.

What is claimed is:

1. A flexible wall washer, characterized in that it comprises:

a strip-shaped PCB (10), which is provided with a plurality of pleated portions (12);

a plurality of the LED chips (11), which are uniformly distributed between the two pleated portions (12) adjacent to each other on the PCB (10); and a plurality of flexible holders (20) and a plurality of lenses (21), wherein the plurality of flexible holders (20) are sequentially hinged at the front and the rear to form a chain holder, each of the flexible holders (20) is provided with a mounting cavity (22) on the rear side, and the top and bottom of the mounting cavity (22) are respectively open, the flexible holder (20) is provided with a mounting hole (200) connected to the top opening of the mounting cavity (22), and the lens (21) is installed in the mounting cavity (22) through the mounting hole (200) and the surface of the lens (21) is flush with the surface of the flexible holder (20); the PCB (10) is disposed on the rear side of the chain holder, the plurality of the lenses (21) cover on the LED chips (11) through the bottom opening of the mounting cavity (22) in one-to-one correspondence, and the pleated portion (12) protrudes in the direction of the flexible holder (20).

2. The flexible wall washer according to claim 1, characterized in that: a notch (121) is provided in the middle of the pleated portion (12).

3. The flexible wall washer according to claim 1, characterized in that: a first stage (23) is provided on the front side of the front end of the flexible holder (20), the first stage (23) being provided with a first perforation (231); a second stage (24) is provided on the back side of the rear end of the flexible holder (20), the thickness of the first stage (23) and the thickness of the second stage (24) being equal to the thickness of the flexible holder (20), and the second stage (24) being provided with a first snap portion (241) extending downwardly, the first snap portion (241) being capable of rotationally snapping into the first perforation (231) of the adjacent flexible holder (20).

4. The flexible wall washer according to claim 3, characterized in that: the first stage (23) is provided with a second perforation (232) and the second stage (24) is correspondingly provided with a second snap portion (242) capable of rotationally snapping into the second perforation (232).

5. The flexible wall washer according to claim 4, characterized in that: the outer edge of the rear side of the first stage (23) is provided with a curved projection (233) extending downwardly, and the inner edge of the second stage (24) is provided with a curved bent portion (243) capable of rotationally snap-fitting with the adjacent curved projection (233) of the flexible holder (20).

6. The flexible wall washer according to claim 5, characterized in that: the curved projection (233), the first perforation (231), and the second perforation (232) are arranged in sequence along the same horizontal line, and the pleated portion (12) is located directly below the first perforation (231).

7. The flexible wall washer according to claim 6, characterized in that: further comprising a plurality of positioning plates (25) corresponding one-to-one with the flexible holders (20), and a snap-in structure (26) provided on the rear side of the flexible holder (20), the positioning plate (25) being able to snap with the snap-in structure (26) to fix the PCB (10) between the positioning plate (25) and the flexible holder (20).

8. The flexible wall washer according to claim 7, characterized in that: a positioning post (27) is provided at the bottom of the mounting cavity (22), and a corresponding positioning hole (28) is provided on the PCB (10) and the connection plate, respectively, and the positioning post (27) is sequentially snapped into the corresponding positioning hole (28).

9. The flexible wall washer according to claim 8, characterized in that:

comprising a flexible lamp housing (30), wherein the flexible lamp housing (30) is sleeved to the PCB (10) and the chain holder.

10. A manufacturing process, applied to the flexible wall washer according to claim 9, characterized in that it comprises the following steps:

Step 1, mounting the LED chips (11) and electronic components on the PCB (10);

Step 2, forming a pleated portion (12) on the PCB (10);

Step 3, mounting the lenses (21) on the flexible holder (20) and connecting the plurality of flexible holders (20) sequentially head to tail to form a chain holder;

Step 4, fixing the PCB (10) to the chain holder through the positioning plate (25);

Step 5, forming a light strip by wrapping the PCB (10) and the chain holder into a molded flexible lamp housing (30) through one-piece extrusion; and Step 6, cutting the light strip into corresponding lengths according to the demand, and then waterproofing and plugging the front and rear of the light strip.

* * * * *